United States Patent Office 3,091,589
Patented May 28, 1963

3,091,589
DRILLING FLUID
John S. Brukner, Houston, Tex., assignor to Texaco Inc., New York, N.Y., a corporation of Delaware
No Drawing. Filed Mar. 15, 1961, Ser. No. 95,819
14 Claims. (Cl. 252—8.5)

This invention relates to aqueous drilling fluids. In accordance with one embodiment this invention is directed to an improved drilling operation employing a special aqueous drilling fluid. In accordance with another embodiment this invention is directed to an aqueous drilling fluid having improved physical and chemical properties.

In a drilling operation, such as in a rotary drilling operation, a drilling fluid is forced down the drill string, about the drill bit at the bottom of the borehole and then back up to the surface. The drilling fluid employed in such a drilling operation usually is an aqueous drilling fluid and is compounded of various materials in order to impart certain desirable physical and chemical properties to the drilling fluid. For example, there is usually incorporated in an aqueous drilling fluid a hydratable clayey material, such as a bentonitic clay, to impart desirable viscosity and gel strength properties to the drilling fluid so as to better enable the drilling fluid to carry away the drilling cuttings from the bottom of the borehole. Other materials such as weighting agents, e.g. barium sulfate, are employed to increase the density of the drilling fluid so as to make the drilling operation more effective and safer by overcoming the fluid pressure within the formation being drilled. Other materials such as water loss improving agents, e.g. carboxymethylcellulose, hydrolyzed starch, etc. are added to reduce the loss of fluid from the drilling fluid into the formation during the drilling operation. Still other materials such as corrosion inhibitors, bactericides and drill bit lubricants are incorporated in the drilling fluid in order to improve the drilling operation and the drilling fluid.

It is an object of this invention to provide an improved aqueous drilling fluid.

Another object of this invention is to provide an improved drilling operation employing a special aqueous drilling fluid.

How these and other objects of this invention are accomplished will become apparent in the light of the accompanying disclosure. In accordance with this invention an improved aqueous drilling fluid is provided by incorporating therein a minor amount of a non-ionic, water soluble compound having the formula:

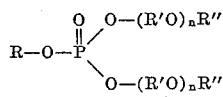

wherein R is an aliphatic hydrocarbyl group containing from 6 to 14 carbon atoms, R′ is a divalent aliphatic hydrocarbylene radical containing from 2 to 4 carbon atoms, R″ is a hydrogen atom or a lower aliphatic hydrocarbyl group containing from 1 to 5 carbon atoms, and $n$ is an integer from 1 to 8.

Exemplary aliphatic hydrocarbyl groups include the normal and branched chain hexyl, heptyl, octyl, 2-ethylhexyl, nonyl, decyl, undecyl, dodecyl, tridecyl and tetradecyl groups, the octyl to dodecyl groups being preferred.

Suitable divalent hydrocarbylene radicals include ethylene, propylene, isopropylene, butylene and isobutylene radicals with ethylene and isopropylene radicals being preferred.

Exemplary lower aliphatic hydrocarbyl groups include methyl, ethyl, propyl, isopropyl, butyl, isobutyl, pentyl and isopentyl radicals. The preferred groups are the methyl, ethyl and isopropyl groups.

Among the non-ionic water soluble phosphate esters suitable for use in the practice of the present invention to improve the chemical and physical properties of aqueous drilling fluids are hexyl di(5-hydroxy-3-oxapentyl) phosphate, heptyl di(7-hydroxy-4-oxaheptyl) phosphate, octyl di(9-hydroxy-5-oxanonyl) phosphate, 2-ethylhexyl 8-hydroxy-3,6-dioxaoctyl 5-hydroxy-3 - oxapentyl phosphate, decyl di(7-hydroxy-4-oxaheptyl) phosphate, dodecyl 5-hydroxy-3-oxapentyl 7-hydroxy-4 - oxaheptyl phosphate, tridecyl di(7-ethoxy-5-oxaheptyl) phosphate, 2-ethylhexyl di(5-butoxy-3-oxapentyl) phosphate, and 2-ethylhexyl di(5-hydroxy-2,5-dimethyl-3-oxapentyl) phosphate.

Water soluble phosphate esters of the foregoing types are commercially available. Victawet-12 sold by Victor Chemical Co. is a water soluble phosphate ester of the above type.

In accordance with this invention it has been discovered that these non-ionic, water soluble phosphate esters when incorporated in a minor amount, such as an amount in the range 0.01–25% by weight, and preferably in the range 0.1–15% by weight, e.g. 1–7 lbs. per bbl. of drilling fluid, impart desirable physical and chemical properties to the resulting treated drilling fluid. Specifically, it has been observed that a drilling fluid containing a minor amount of such a phosphate ester exhibits less corrosive effect upon metal surfaces exposed thereto, i.e. these non-ionic, water soluble esters act as corrosion inhibitors in such drilling fluids.

It has also been observed that these water soluble, non-ionic phosphate esters impart hydrophobic properties to metal surfaces in contact therewith, i.e. these materials render metal surfaces such as steel and other iron-containing materials hydrophobic or water repellent. Further, it has also been observed that these materials act as extreme pressure additives thereby improving the lubricity of drilling fluids containing the same, with the result that the drilling operation is improved and the efficiency and the useful life of the drilling bit also are improved and extended.

The following are illustrative of the practice of this invention. In order to demonstrate the effectiveness of these materials for imparting hydrophobic properties to metallic surfaces in contact therewith, aqueous drilling fluids were tested, with an without the addition of a non-ionic, water soluble phosphate ester of this invention. The results of these tests are set forth in accompanying Table I.

*Table I*

| Test No. | Drilling mud | pH | Ca++ (p.p.m.) | Time interval sample coupon left in mud | Wettability of metal coupon |
|---|---|---|---|---|---|
| 1 | Aqueous spud mud, 9.5% total solids+2 lbs./bbl. $CrF_3 \cdot 4H_2O$+2 lbs./bbl. sodium citrate. | 7.1 | 240 | 7 days | Hydrophilic. |
| 2 | Aqueous spud mud, 9.5% total solids+2 lbs./bbl. $CrF_3 \cdot 4H_2O$+ 2 lbs./bbl. sodium citrate+1.2 vol. percent Phosphate Ester "A."* | 7.4 | 260 | 7 days | Hydrophobic. |
| | | | | High temp. shear, 24 hrs. at 350° F., lbs./100 ft.² | Wettability of interior of bomb |
| 3 | Aqueous low lime field mud weighing 16.2 lbs./gal. and containing 34.0% solids. | 11.8 | 160 | 2600 plastic | Hydrophilic. |
| 4 | Aqueous low lime field mud, as No. 3 above, +2.4% by vol. of Phosphate Ester A.* | 10.6 | 920 | 1010 plastic | Hydrophobic. |

*Phosphate ester "A" is 2-ethylhexyl di(8-hydroxy 3,6-dioxaoctyl) phosphate.

The data set forth in accompanying Table I clearly indicate that an aqueous drilling fluid prepared in accordance with this invention imparts hydrophobic properties to metal surfaces in contact therewith thereby tending to improve the corrosion resistance of these metals.

Additional tests were carried out in connection with a lime-containing drilling mud containing varying amounts of Phosphate Ester "A" added thereto. The results of these tests are set forth in accompanying Table II.

*Table III*

| Drilling mud tested | pH | Ca++, p.p.m. | Wettability of steel surface after immersion for 7 days in mud at— | |
|---|---|---|---|---|
| | | | 78° F. | 300° F. |
| Shale control mud, 12.7 lbs./gal., containing 24.5% solids and 12% by vol. oil. | 12.2 | 750 | Water wet | Water wet. |
| Shale control mud above +3.5 lbs./bbl. of Phosphate Ester "A". | 12.0 | 1,280 | Slightly oil wet. | Slightly oil wet. |

*Table II*

[A lime-containing drilling mud employing ferro-chrome lignosulfonate as the dispersing agent, weighing 15.8 lbs./gal., 67 sec. funnel viscosity, 29.5% by vol. Fann solids and containing 15.5% by vol. oil emulsified therein]

| Mud + Additions | Viscosity, $V_{600}$ | pH | Ca++ (p.p.m.) | Surface of steel coupon after immersion in mud for— | |
|---|---|---|---|---|---|
| | | | | 7 days at room temp. | 7 days at 300° F. |
| Above field mud as is, no additions | 114.5 | 11.7 | 400 | Water wet | Water wet. |
| Above field mud + 0.875 lbs./bbl. Phosphate Ester "A" | 112.5 | 11.5 | 720 | Slightly oil wet | Slightly oil wet. |
| Above field mud + 1.75 lbs./bbl. Phosphate Ester "A" | 98.4 | 11.4 | 1,260 | Oil wet | Oil wet. |
| Above field mud +3.5 lbs./bbl. of Phosphate Ester "A" | 95.2 | 11.2 | 1,200 | do | Do. |
| Above field mud +7.0 lbs./bbl. of Phosphate Ester "A" | 90.1 | 10.9 | 1,600 | do | Do. |

The results set forth in accompanying Table II likewise confirm that the metal surfaces in contact with a drilling fluid prepared in accordance with this invention are rendered hydrophobic.

Additional tests were carried out upon a shale control drilling fluid which is characterized by an aqueous phase saturated with calcium hydroxide, containing calcium chloride dissolved therein, having a pH not greater than 12.6 and having a calcium ion concentration in excess of 200 p.p.m. The results of these tests are set forth in accompanying Table III.

The effectiveness of the phosphate ester employed in aqueous drilling fluids in accordance with this invention to impart desirable extreme pressure properties and lubricity properties to the drilling fluids is indicated in the data set forth in accompanying Table IV.

*Table IV*

| Drilling mud tested | Viscosity, $V_{600}$ | pH | Ca++, p.p.m. | Temp., °F. after run | Extreme pressure tester | | | |
|---|---|---|---|---|---|---|---|---|
| | | | | | Load (inch-pound) | Scar width (inches) | Amps | Appearance |
| Shale control mud, 13.1 lbs/gal., containing 24% solids and 10.5% by vol. oil | 98.3 | 12.1 | 840 | 170 | 200 | 0.235 | 3.4 | Slight Seizure. |
| Shale control mud above +3 lbs./bbl. of Phosphate Ester "A" | >135 | 11.9 | 1,200 | 150 | 200 | 0.180 | 3.4 | Smooth scar no seizure. |
| Shale control mud above + 6 lbs./bbl. of Phosphate Ester "A" | >135 | 11.6 | 1,400 | 155 | 200 | 0.180 | 3.5 | Do. |

The data set forth in accompanying Table IV clearly indicate that the extreme pressure properties of aqueous drilling fluids prepared in accordance with this invention are improved.

As indicated hereinabove and as exemplified by the foregoing tests the practice of this invention is applicable for the improvement of any type of aqueous drilling fluid. The practice of this invention, however, is particularly applicable to the improvement of lime-containing aqueous drilling fluids such as shale control drilling fluids and the so-called high pH lime base drilling fluids characterized by having an aqueous phase having a pH greater than about 12.6 and a calcium ion content below about 150 p.p.m. The practice of this invention is also applicable for the improvement of the so-called gyp drilling fluids characterized by having an aqueous phase having a calcium ion concentration in excess of 200 p.p.m. and a pH in the range 7–10.5, the aqueous phase thereof not being saturated with calcium hydroxide as in the case of shale control drilling fluids.

As will be apparent to those skilled in the art many modifications, substitutions and changes may be made in the practice of this invention without departing from the spirit or scope thereof.

The subject application is a continuation-in-part of our commonly assigned copending application Serial No. 856,923, filed December 3, 1959, now abandoned.

I claim:

1. An aqueous drilling fluid comprising clay dispersed in an aqueous phase and containing a minor amount in the range of from about 0.01 to 25 percent by weight of a non-ionic water soluble phosphate having the formula:

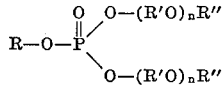

wherein R is an aliphatic hydrocarbyl group containing from 6 to 14 carbon atoms, R' is a divalent aliphatic hydrocarbylene radical containing from 2 to 4 carbon atoms, R" is a member selected from the group consisting of hydrogen and a lower aliphatic hydrocarbyl group containing from 1 to 5 carbon atoms, and n is an integer from 1 to 8.

2. An aqueous drilling fluid as defined in claim 1 wherein said phosphate is 2-ethylhexyl di(7-hydroxy-4-oxaheptyl)phosphate.

3. An aqueous drilling fluid comprising an aqueous phase having hydratable drilling clay material dispersed therein, said aqueous phase having a calcium ion concentration in excess of 200 p.p.m. and a pH not in excess of 12.6 and a minor amount in the range of from about 0.01 to 25 percent by weight of a non-ionic water soluble phosphate having the formula:

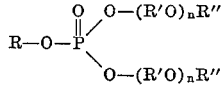

wherein R is an aliphatic hydrocarbyl group containing from 6 to 14 carbon atoms, R' is a divalent aliphatic hydrocarbylene radical containing from 2 to 4 carbon atoms, R" is a member selected from the group consisting of hydrogen and a lower aliphatic hydrocarbyl group containing from 1 to 5 carbon atoms, and n is an integer from 1 to 8.

4. An aqueous drilling fluid as defined in claim 3, wherein said phosphate is dodecyl d(8-hydroxy-3,6-dioxaoctyl) phosphate.

5. An aqueous drilling fluid characterized by an aqueous phase having a calcium ion concentration in excess of 200 p.p.m. and a pH not in excess of 12.6, said aqueous phase containing dissolved therein from 0.1 to 15 percent by weight of a non-ionic water soluble phosphate having the formula:

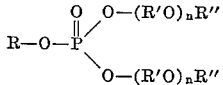

wherein R is an aliphatic hydrocarbyl group containing from 6 to 14 carbon atoms, R' is a divalent aliphatic hydrocarbylene radical containing from 2 to 4 carbon atoms, R" is a member selected from the group consisting of hydrogen and a lower aliphatic hydrocarbyl group containing from 1 to 5 carbon atoms, and n is an integer from 1 to 8.

6. An aqueous drilling fluid comprising an aqueous phase saturated with calcium hydroxide, said aqueous phase having a calcium ion concentration not greater than about 200 p.p.m. and a pH greater than 12.6, and containing dissolved therein a minor amount in the range of from about 0.01 to 25 percent by weight of a non-ionic water soluble phosphate having the formula:

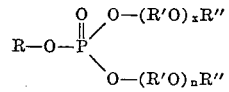

wherein R is an aliphatic hydrocarbyl group containing from 6 to 14 carbon atoms, R' is a divalent aliphatic hydrocarbylene radical containing from 2 to 4 carbon atoms, R" is a member selected from the group consisting of hydrogen and a lower aliphatic hydrocarbyl group containing from 1 to 5 carbon atoms, and n is an integar from 1 to 8.

7. In a drilling operation wherein an aqueous drilling fluid is pumped down a drill string about a drill bit and back to the surface, the improvement which comprises employing as said aqueous drilling fluid an aqueous drilling fluid containing a minor amount in the range of from about 0.01 to 25 percent by weight of a non-ionic, water soluble phosphate having the formula:

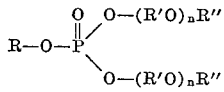

wherein R is an aliphatic hydrocarbyl group containing from 6 to 14 carbon atoms, R' is a divalent aliphatic hydrocarbylene radical containing from 2 to 4 carbon atoms, R" is a member selected from the group consisting of hydrogen and a lower aliphatic hydrocarbyl group containing from 1 to 5 carbon atoms, and n is an integer from 1 to 8.

8. An improved drilling fluid consisting essentially of an aqueous phase containing hydratable drilling clay material dispersed therein, said aqueous phase characterized by a calcium ion concentration in excess of 200 p.p.m., a pH not in excess of 12.6 and being saturated with calcium hydroxide, and a minor amount in the range of from about 0.01 to 25 percent by weight of a water soluble, non-ionic phosphate having the formula:

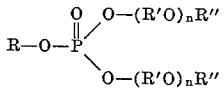

wherein R is an aliphatic hydrocarbyl group containing from 6 to 14 carbon atoms, R' is a divalent aliphatic hydrocarbylene radical containing from 2 to 4 carbon atoms, R" is a member selected from the group consisting of hydrogen and a lower aliphatic hydrocarbyl group containing from 1 to 5 carbon atoms, and n is an integer from 1 to 8.

9. A drilling fluid in accordance with claim 8 wherein said phosphate is 2-ethylhexyl di(8-hydroxy 3,6 dioxaoctyl) phosphate.

10. A drilling fluid composition in accordance with claim 8 wherein said drilling fluid contains dissolved therein a minor amount of a water soluble chromium salt.

11. A drilling fluid composition in accordance with claim 8 wherein said chromium salt is chromium fluoride.

12. A drilling fluid composition in accordance with claim 8 wherein the concentration of said phosphate is in the range 0.1–15.0% by weight based on said drilling fluid.

13. A drilling fluid composition in accordance with claim 8 wherein said phosphate is present in said drilling fluid in an amount of at least about 1 lb. per bbl. of resulting drilling fluid.

14. An aqueous drilling fluid comprising hydratable clay dispersed in a lime-containing aqueous phase and containing a minor amount in the range of from about 0.01 to 25 percent by weight of a non-ionic, water soluble phosphate having the formula:

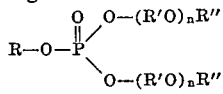

wherein R is an aliphatic hydrocarbyl group containing from 6 to 14 carbon atoms, R' is a divalent aliphatic hydrocarbylene radical containing from 2 to 4 carbon atoms, R" is a member selected from the group consisting of hydrogen and a lower aliphatic hydrocarbyl group containing from 1 to 5 carbon atoms, and $n$ is an integer from 1 to 8.

References Cited in the file of this patent

UNITED STATES PATENTS

| | | |
|---|---|---|
| 2,285,853 | Downing et al. | June 9, 1942 |
| 2,723,237 | Ferrin | Nov. 8, 1955 |
| 2,773,030 | Tailleur | Dec. 4, 1956 |
| 2,802,783 | Weiss et al. | Aug. 13, 1957 |
| 2,868,726 | Brukner et al. | Jan. 13, 1959 |

FOREIGN PATENTS

| | | |
|---|---|---|
| 663,557 | Great Britain | Dec. 27, 1951 |

OTHER REFERENCES

Rosenberg et al.: Increased Drill Bit Life Through Use of Extreme Pressure Lubricant Drilling Fluids, article in the Journal of Petroleum Technology, vol. 216, August 1959, pages 195 to 202.

Zimmerman et al.: Handbook of Material Trade Names, 1953 edition, published by Industrial Research Service of Dover, N.H., page 604.